United States Patent
Yano et al.

(10) Patent No.: US 7,659,006 B2
(45) Date of Patent: Feb. 9, 2010

(54) LAMINATED POLYESTER FILM AND MANUFACTURING PROCESS THEREOF

(75) Inventors: Shinji Yano, Anpachi-gun (JP); Atsushi Oyamatsu, Anpachi-gun (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 346 days.

(21) Appl. No.: 11/597,710

(22) PCT Filed: May 25, 2005

(86) PCT No.: PCT/JP2005/010006

§ 371 (c)(1),
(2), (4) Date: Nov. 28, 2006

(87) PCT Pub. No.: WO2005/116120

PCT Pub. Date: Dec. 8, 2005

(65) Prior Publication Data

US 2007/0184262 A1 Aug. 9, 2007

(30) Foreign Application Priority Data

May 28, 2004 (JP) ............................. 2004-158974

(51) Int. Cl.
 B32B 27/32 (2006.01)
 B32B 5/16 (2006.01)
 B32B 27/36 (2006.01)
 B05D 3/02 (2006.01)

(52) U.S. Cl. ...................... 428/480; 428/220; 428/323; 428/327; 428/331; 428/483; 427/372.2

(58) Field of Classification Search .................. None
See application file for complete search history.

(56) References Cited

U.S. PATENT DOCUMENTS 5,672,409 A 9/1997 Miyakawa et al.

7,005,176 B2 * 2/2006 Tojo et al. .................. 428/141
2002/0018886 A1 2/2002 Matsufuji et al.
2003/0096102 A1 5/2003 Yoshihara et al.
2004/0034142 A1 * 2/2004 Kawakami et al. .......... 524/417

FOREIGN PATENT DOCUMENTS

| JP | 62-232646 A | 10/1987 |
| JP | 63-37167 A | 2/1988 |
| JP | 6-116487 A | 4/1994 |
| JP | 10-119215 A | 5/1998 |
| JP | 10-237348 A | 9/1998 |
| JP | 2000-229395 A | 8/2000 |
| JP | 2000-246855 A | 9/2000 |
| JP | 2001-96696 A | 4/2001 |
| JP | 2001-323087 A | 11/2001 |
| JP | 2002-127632 A | 5/2002 |
| JP | 2004-9362 A | 1/2004 |

OTHER PUBLICATIONS

English Translation of Chinese Office Action issued Mar. 7, 2008.
Translation of the International Preliminary Report on Patentability dated Dec. 7, 2006.
Database WPI Week 200245, Thomson Scientific, London, GB; AN 2002-419498; XP002523274; Abstract of JP 2001-323087.
Database WPI Week 198746 Thomson Scientific, London, GB; AN 1987-325353; XP002523273; Abstract of JP 62-232646.
Database WPI Week 200273 Thomson Scientific, London, GB; AN 2002-676925; XP002523312; Abstract of 2002-127632.

* cited by examiner

*Primary Examiner*—Sheeba Ahmed
(74) *Attorney, Agent, or Firm*—Sughrue Mion, PLLC

(57) ABSTRACT

A laminated polyester film comprising a coating layer formed on at least one side of a polyester film, this coating layer comprising a polymer binder and inorganic-organic composite particles having an average particle diameter of 200 to 2,000 nm. This film has excellent scratch resistance, adhesion, transparency and slipperiness and is useful as an adhesive film for optical use.

3 Claims, No Drawings

LAMINATED POLYESTER FILM AND MANUFACTURING PROCESS THEREOF

TECHNICAL FIELD

The present invention relates to a laminated polyester film and a manufacturing process thereof. More specifically, it relates to a laminated polyester film having a coating film formed on at least one side of a polyester film.

BACKGROUND ART

A polyester film, especially a biaxially oriented film made of polyethylene terephthalate or polyethylene naphthalate is widely used as a material for magnetic tapes, ferromagnetic thin film tapes, photo films, package films, films for electronic parts, electric insulating films, films to be laminated on a metal plate, films to be put on the surface of a glass display and films for protecting various members because it has excellent mechanical properties, thermal resistance and chemical resistance.

The polyester film is now frequently used in various optical films. For example, it is used as a base film for prism lens sheets, touch panels and back lights which are members of a liquid crystal display, base film for anti-reflection films, electromagnetic shielding film for plasma displays, base film for organic EL displays or base film for preventing the explosion of a display. The base films for use in the above optical films need to have excellent transparency. Further, they need to have excellent adhesion to a prism lens layer, hard coat, pressure sensitive adhesive, anti-reflection treatment and sputter layer.

Since the base films for optical use need to have transparency, the amount of a filler generally added must be minimized. To improve the bonding force of an adhesive layer, a resin having a low glass transition point is used in the adhesive layer. As the film for optical use contains a minimum amount of a filler or does not contain a filler at all, the surface of the film is flat. Further, as a resin having a low glass transition point is used in the adhesive layer, when the film is rolled or overlapped with another film, blocking occurs, whereby these films do not slide over each other, resulting in reduced handling ease or a cracked surface in the film forming step or processing step. Although lubricity and scratch resistance can be improved by adding fine particles to the adhesive layer to solve these problems, the haze of the adhesive layer may increase and transparency may lower. Further, when the base film is highly transparent, a small change in the thickness of an adhesive coating layer becomes a coating defect, thereby deteriorating the appearance of the film. To improve scratch resistance and lubricity, the use of fine particles having a particle diameter larger than 200 nm is proposed (JP-A 2001-96696 and JP-A 2000-229395). However, these technologies have a problem that the film is scratched by its contact with a hard object such as a metal roll due to the fall of fine particles or the low scratch resistance of the film.

It is proposed that an adhesive layer such as a polyester resin, acrylic resin or urethane resin adhesive layer is formed on the surface of a polyester film because a biaxially oriented polyester film generally has low adhesion to another material, for example, a prism lens layer or hard coat essentially composed of an acrylic resin (JP-A 10-119215 and JP-A 2000-246855). However, a biaxially oriented polyester film having an adhesive layer made of one of these resins may be unsatisfactory in bonding force. For example, a CRT film is unsatisfactory in adhesion to a pressure sensitive adhesive layer and therefore has low general applicability though it is satisfactory in adhesion to a hard coat layer on the opposite side.

DISCLOSURE OF THE INVENTION

It is an object of the present invention to provide a laminated polyester film which has solved the above problems of the prior art and has excellent transparency, slipperiness and scratch resistance, great bonding force to a layer used for various optical purposes and few coating defects.

It is another object of the present invention to provide an industrially advantageous process of manufacturing the laminated polyester film of the present invention.

Other objects and advantages of the present invention will become apparent from the following description.

According to the present invention, firstly, the above objects and advantages of the present invention are attained by a laminated polyester film comprising:

(A) a polyester film; and
(B) a coating layer formed on at least one side of the polyester film (A) and made of a coating composition comprising a polymer binder and inorganic-organic composite particles having an average particle diameter of 200 to 2,000 nm.

According to the present invention, secondly, the above objects and advantages of the present invention are attained by a process of manufacturing a laminated polyester film, comprising the steps of:

applying an aqueous coating solution containing a polymer binder and inorganic-organic composite particles having an average particle diameter of 200 to 2,000 nm to at least one side of a polyester film before the completion of crystal orientation; and stretching the coated film in at least one direction and heat setting it to form a coating layer on at least one side of the stretched polyester film.

The laminated polyester film of the present invention is advantageously used as an adhesive film for optical use.

BEST MODE FOR CARRYING OUT THE INVENTION

The present invention will be described in detail hereinunder.

[Polyester Film]

The polyester constituting the laminated polyester film of the present invention is a linear saturated polyester which is synthesized from an aromatic dibasic acid or an ester forming derivative thereof and a diol or an ester forming derivative thereof. Illustrative examples of the polyester include polyethylene terephthalate, polyethylene isophthalate, polybutylene terephthalate, poly(1,4-cyclohexylenedimethylene terephthalate) and polyethylene-2,6-naphthalate. Out of these, polyethylene terephthalate or polyethylene-2,6-naphthalate is preferably used because they have good balance between mechanical properties and optical properties.

The polyester may be a copolymer of the recurring units of the above polyesters or a blend of 80 mol % or more of one of the above polyesters and 20 mol % or less of another resin.

The polyester may contain a colorant, antistatic agent, antioxidant, organic lubricant and catalyst. It is preferred that the polyester should not contain a filler from the viewpoint of transparency.

The polyester film can be obtained by melting and extruding the above polyester into a film form, solidifying it on a casting drum by cooling to obtain an unstretched film, stretching this unstretched film one time or more in a longitudinal direction at a total draw ratio of 3 to 6 times at a temperature of Tg to (Tg+60)° C. and optionally in a transverse direction at a draw ratio of 3 to 5 times at a temperature of Tg to (Tg+60)° C., and further heat setting it at 180 to 230° C. for 1 to 60 seconds as required and preferably heat setting it again at a temperature 10 to 20° C. lower than the above heat setting temperature to shrink the obtained film by 0 to 20% in the transverse direction. The glass transition temperature is represented by Tg.

The thickness of the polyester film is preferably 25 to 300 μm, particularly preferably 50 to 250 μm in order to obtain required strength when it is used as a substrate for liquid crystals, hard coats, touch panels, glare shielding treatment, PDP electromagnetic shielding films and organic EL.

[Coating Layer]

The laminated polyester film of the present invention has a coating layer on at least one side of the polyester film. This coating layer is made of a coating composition comprising a polymer binder and inorganic-organic composite particles having an average particle diameter of 20 to 2,000 nm.

[Polymer Binder]

Examples of the polymer binder include polyester resin, acrylic resin, urethane resin and a blend thereof.

A polyester obtained from the following polybasic acid component and diol component may be used as the polyester resin. Examples of the polybasic acid component include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid and 5-sodium sulfoisophthalic acid. A copolyester obtained from two or more dicarboxylic acid components is preferably used as the polyester resin. The polyester resin may contain a slight amount of, for example, 1 to 5 mol % of an unsaturated polybasic acid component such as maleic acid or itaconic acid, or a hydroxycarboxylic acid component such as p-hydroxybenzoic acid based on the total of all the dicarboxylic acid components.

Examples of the diol component include ethylene glycol, 1,4-butanediol, diethylene glycol, dipropylene glycol, 1,6-hexanediol, 1,4-cyclohexanedimethanol, xylene glycol, dimethylolpropane, poly(ethyleneoxide)glycol and poly(tetramethyleneoxide)glycol.

The monomer constituting the acrylic resin is an acrylic monomer. Examples of the acrylic monomer include alkyl acrylates and alkyl methacrylates (examples of the alkyl group include methyl group, ethyl group, n-propyl group, isopropyl group, n-butyl group, isobutyl group, t-butyl group, 2-ethylhexyl group and cyclohexyl group); hydroxy group-containing monomers such as 2-hydroxyethyl acrylate, 2-hydroxyethyl methacrylate, 2-hydroxypropyl acrylate and 2-hydroxypropyl methacrylate; epoxy group-containing monomers such as glycidyl acrylate, glycidyl methacrylate and allyl glycidyl ether; monomers having a carboxyl group or a salt thereof such as acrylic acid, methacrylic acid, itaconic acid, maleic acid, fumaric acid, crotonic acid, styrenesulfonic acid and salts thereof (sodium salts, potassium salts, ammonium salts, tertiary amine salts, etc.); monomers having an amide group such as acrylamide, methacrylamide, N-alkylacrylamide, N-alkylmethacrylamide, N,N-dialkyl acrylamide, N,N-dialkyl methacrylate (examples of the alkyl group include methyl group, ethyl group, n-propyl group, isopropyl group, n-butyl group, isobutyl group, t-butyl group, 2-ethylhexyl group and cyclohexyl group), N-alkoxyacrylamide, N-alkoxymethacrylamide, N,N-dialkoxyacrylamide, N,N-dialkoxymethacrylamide (examples of the alkoxy group include methoxy group, ethoxy group, butoxy group and isobutoxy group), acryloylmorpholine, N-methylolacrylamide, N-methylolmethacrylamide, N-phenylacrylamide and N-phenylmethacrylamide; acid anhydride monomers such as maleic anhydride and itaconic anhydride; and other monomers such as vinyl isocyanate, allyl isocyanate, styrene, α-methylstyrene, vinyl methyl ether, vinyl ethyl ether, vinyl trialkoxysilane, alkyl maleic acid monoester, alkyl fumaric acid monoester, alkyl itaconic acid monoester, acrylonitrile, methacrylonitrile, vinylidene chloride, ethylene, propylene, vinyl chloride, vinyl acetate and butadiene. The acrylic monomer is not limited to these.

The above monomers may be used alone or in combination of two or more as the monomer component of the acrylic resin.

An acrylic resin having an oxazoline group and polyalkylene oxide chain is preferably used as the acrylic resin.

An acrylic resin comprising a monomer having an oxazoline group and a monomer having a polyalkylene oxide chain may be used as the acrylic resin.

Examples of the monomer having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-methyl-2-oxazoline. They may be used alone or in combination of two or more. Out of these, 2-isopropenyl-2-oxazoline is preferred as it is easily acquired industrially. The cohesive force of the coating layer is improved by using an acrylic resin having an oxazoline group, thereby increasing adhesion to a hard coat and a pressure sensitive adhesive layer. Further, scratch resistance against a metal roll in the step of forming a film or the step of processing a hard coat can be provided.

Examples of the monomer having a polyalkylene oxide chain include what are obtained by adding polyalkylene oxide to the ester moiety of acrylic acid or methacrylic acid. Examples of the polyalkylene oxide chain include polymethylene oxide, polyethylene oxide, polypropylene oxide and polybutylene oxide. The number of the recurring units of the polyalkylene oxide chain is preferably 3 to 100. Compatibility between the polyester resin and the acrylic resin of the polymer binder in the coating layer is improved by using the acrylic resin having a polyalkylene oxide chain as compared with an acrylic resin having no polyalkylene oxide chain, thereby making it possible to improve the transparency of the coating layer. When the number of the recurring units of the polyalkylene oxide chain is smaller than 3, compatibility between the polyester resin and the acrylic resin deteriorates with the result of the low transparency of the coating layer. When the number of the recurring units is larger than 100, the wet heat resistance of the coating layer lowers with the result of reduced adhesion to a hard coat at a high humidity and a high temperature.

The urethane resin comprises a polyol, polyisocyanate, chain extender and crosslinking agent. Examples of the polyol include polyethers such as polyoxyethylene glycol, polyoxypropylene glycol and polyoxytetramethylene glycol, polyesters having a hydroxyl group at both terminals manufactured through a dehydration reaction between a glycol and a dicarboxylic acid, such as polyethylene adipate having a hydroxyl group at both terminals, polyethylene-butylene adipate and polycaprolactone, polycarbonates having a hydroxyl group at both terminals, acryl-based polyols and castor oil. Examples of the polyisocyanate include tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate. Examples of the chain extender or crosslinking agent include ethylene glycol, propylene glycol, diethylene glycol, trimethylolpropane, hydrazine, ethylene diamine, diethylene triamine, triethylene tetramine, 4,4'-diaminodiphenylmethane, 4,4'-diaminodicyclohexylmethane and water.

Out of these, a mixture of a polyester resin and an acrylic resin is preferred, and a mixture of a polyester resin and an acrylic resin having an oxazoline group and a polyalkylene oxide chain is particularly preferred from the viewpoint of providing high adhesion. The polymer binder is preferably soluble or dispersible in water. A polymer binder soluble in water containing a small amount of an organic solvent may also be preferably used.

The glass transition point of the polyester resin of the polymer binder is preferably 40 to 100° C., more preferably 60 to 80° C. Within the above range, excellent adhesion and excellent scratch resistance can be obtained. When the glass transition temperature is lower than 40° C., blocking readily occurs between films. When the glass transition temperature is higher than 100° C., the coating film becomes hard and brittle, and scratch resistance and film formability deteriorate with the result of a bad appearance of the coating layer.

The content of the polyester resin constituting the polymer binder in the coating layer is preferably 5 to 95 wt %, more preferably 50 to 90 wt %.

The content of the acrylic resin having an oxazoline group and a polyalkylene oxide chain constituting the polymer binder in the coating layer is preferably 5 to 95 wt %, more preferably 5 to 90 wt %, particularly preferably 10 to 50 wt %.

When the content of the polyester resin is higher than 95 wt % or the content of the acrylic resin having an oxazoline group and a polyalkylene oxide chain is lower than 5 wt %, the cohesive force of the coating layer may lower and adhesion to a hard coat or a pressure sensitive adhesive may become unsatisfactory disadvantageously. When the content of the polyester resin is lower than 5 wt % or the content of the acrylic resin is higher than 95 wt %, adhesion to the polyester film lowers, and adhesion to the hard coat or the pressure sensitive adhesive may become unsatisfactory disadvantageously.

[Inorganic-organic Composite Particles]

The inorganic-organic composite particles are particles of a composite of an inorganic material and an organic material. Examples of the inorganic material include silicon oxide, calcium carbonate, magnesium carbonate, calcium oxide, zinc oxide, magnesium oxide, sodium silicate, aluminum oxide, iron oxide, zirconium oxide, barium sulfate, titanium oxide, tin oxide, antimony trioxide, carbon black and molybdenum disulfide. Out of these, silicon oxide is particularly preferred.

The organic material is preferably a polymer from the viewpoint of developing the fixing force of the coating layer. The molecular weight, shape, composition and the existence of a functional group of the polymer are not particularly limited and any polymer may be used. For example, acrylic resin, polyester resin, urethane resin, silicone resin, fluorine resin, benzoguanamine resin, phenolic resin and nylon resin may be used. Out of these, acrylic resin is particularly preferred.

The inorganic-organic composite particles are preferably fine particles containing elemental silicon because excellent fixing force and scratch resistance are obtained. The fine particles preferably contain 10 to 40 wt % of elemental silicon. When the content of elemental silicon in the fine particles is lower than 10 wt %, excellent scratch resistance is hardly obtained and when the content is higher than 40 wt %, excellent fixing force is hardly obtained disadvantageously.

The inorganic-organic composite particles can be obtained by coating the surfaces of fine particles of an inorganic substance with an organic substance, by coating the surfaces of fine particles of an organic substance with an inorganic substance, or by mixing together an inorganic substance and an organic substance. The term "mixing" means that an organic substance is mixed with an inorganic substance in a molecular order, an organic substance enters inorganic particles having a porous structure, inorganic fine particles enter the entangled structure of an organic substance, or fine particles made of a mixture of an organic substance and an inorganic substance are coated with an organic substance or an inorganic substance.

Particularly preferred examples of the inorganic-organic composite particles include silicon oxide-acrylic resin composite and silicon oxide-silicone resin composite particles.

As for the shape of the inorganic-organic composite particles, they are spherical, needle-like, plate-like, flaky or ground and are not limited to a particular shape. They are preferably spherical or close to a spherical shape.

In the inorganic-organic composite particles of the present invention, the inorganic substance and the organic substance may be fixed to each other physically or chemically. The expression "fixed physically" means that a polymer forms a crosslinked structure in inorganic particles having a porous structure to fix the inorganic substance and the organic substance. The expression "fixed chemically" means that the organic substance and the inorganic substance are fixed by a chemical bond. The chemically fixed particles are preferred from the viewpoint of strength.

In either case, to avoid precipitation in a water dispersion, fine particles having a specific gravity of not more than 3 are preferably selected.

The average particle diameter of the inorganic-organic composite particles is 200 to 2,000 nm, preferably 300 to 1,500 nm. When the average particle diameter is smaller than 200 nm, the step in which the coating film is readily scratched, for example, scratch resistance against a metal roll having large torque becomes unsatisfactory, whereby the surface of the film may be scratched. When the average particle diameter is larger than 2,000 nm, the surface haze of the film becomes high, thereby deteriorating the optical properties.

Since the particles of the coating composition are composite particles of an inorganic substance and an organic substance, cohesive force between the coating layer and the particles becomes large, whereby the particles are prevented from falling off. That is, in the present invention, even when fine particles having an average particle diameter much larger than the thickness of the coating layer are contained in the coating layer, the fine particles do not fall off from the film. For example, when fine particles having an average particle diameter larger than 200 nm are used in a coating layer having a thickness of 0.05 µm, the fine particles do not fall off from the film. In contrast to this, when fine particles made of an inorganic substance alone are used, as the hardness of the fine particles is high, a film having excellent scratch resistance can be obtained but compatibility between the fine particles and the polymer binder may be low and therefore the fine particles readily fall off. When fine particles made of an organic substance alone are used, they hardly fall off from the film due to high compatibility between them and the polymer binder and large cohesive force between them and the binder but sufficiently high scratch resistance is hardly obtained due to the low hardness of the fine particles.

The content of the inorganic-organic composite particles in the coating composition is preferably 0.01 to 5 parts by weight based on 100 parts by weight of the coating composition of the coating layer. When the content is lower than 0.01 part by weight, sufficiently high lubricity and scratch resistance are not obtained and when the content is higher than 5 parts by weight, the surface haze of the coating film becomes high disadvantageously.

[Aliphatic Wax]

The coating composition may further contain an aliphatic wax. The content of the aliphatic wax is preferably 0.5 to 30 wt %, more preferably 1 to 10 wt %. When the content is lower than 0.5 wt %, the lubricity of the surface of the film may not be obtained disadvantageously. When the content is higher than 30 wt %, adhesion to a polyester film substrate or adhesion to a hard coat or a pressure sensitive adhesive may become unsatisfactory disadvantageously. Examples of the aliphatic wax include vegetable waxes such as carnauba wax, candelila wax, rice wax, haze wax, Jojoba oil, palm wax, rosin modified wax, Ovricury wax, sugar cane wax, esparto wax and bark wax, animal waxes such as beeswax, lanolin, whale wax, Chinese wax and shellac wax, mineral waxes such as montan wax, ozokerite and ceresin wax, petroleum waxes such as paraffin wax, microcrystalline wax and petrolatum, and synthetic hydrocarbon waxes such as Fischer-Tropsch wax, polyethylene wax, polyethylene oxide wax, polypropylene wax and polypropylene oxide wax. Out of these, carnauba wax, paraffin wax and polyethylene wax are particularly preferred as they have excellent adhesion to a hard coat and a pressure sensitive adhesive and lubricity. They may be used as a water dispersion because they can reduce an environmental load and are easy to handle.

[Manufacturing Process]

In the present invention, the coating layer can be formed by applying a coating composition in the form of an aqueous coating solution to a polyester film to form a coating film and solidifying it. The aqueous coating solution is preferably an aqueous solution, aqueous dispersion or emulsion. To form the coating film, resins other than the above composition, such as an antistatic agent, colorant, surfactant, ultraviolet light absorber and crosslinking agent may be added as required.

The concentration of the coating composition (solid content) in the aqueous coating solution used to form the coating film is preferably 20 wt % or less, more preferably 1 to 10 wt %. When this concentration is lower than 1 wt %, wettability to the polyester film may become unsatisfactory and when the concentration is higher than 20 wt %, the stability of the aqueous coating solution and the appearance of the coating layer may deteriorate disadvantageously.

The aqueous coating solution may be applied to the polyester film in any stage but preferably in the step of manufacturing a polyester film. That is, the aqueous coating solution is preferably applied to the polyester film which is in the middle of the stretching step, i.e., before the completion of crystal orientation.

The polyester film before the completion of crystal orientation is an unstretched film, a monoaxially oriented film obtained by orienting an unstretched film in either one of longitudinal and transverse directions or a biaxially oriented film obtained by orienting the film in longitudinal and transverse directions at a low draw ratio (biaxially oriented film re-oriented in a longitudinal or transverse direction in the end before the completion of crystal orientation). Preferably, the aqueous coating solution of the coating composition is applied to an unstretched film or a monoaxially oriented film which has been oriented in one direction, and the coated film is oriented in a longitudinal and/or transverse direction and heat set to form a coating layer.

To apply the aqueous coating solution to the film, preferably, the surface of the film is subjected to a physical treatment such as corona surface treatment, flame treatment or plasma treatment as a pre-treatment for improving coatability, or a chemically inactive surfactant is used in combination with the composition.

The surfactant promotes the wettability of the aqueous coating solution to the polyester film and improves the stability of the coating solution. Examples of the surfactant include anionic and nonionic surfactants such as polyoxyethylene-fatty acid esters, sorbitan fatty acid esters, glycerin fatty acid esters, fatty acid metal soap, alkyl sulfates, alkyl sulfonates and alkyl sulfosuccinates. The surfactant is preferably contained in an amount of 1 to 10 parts by weight based on 100 parts by weight of the coating composition of the aqueous coating solution.

The amount of coating of the aqueous coating solution is preferably such that the thickness of the coating film becomes 0.04 to 0.5 µm, preferably 0.05 to 0.4 µm. When the thickness of the coating film is too small, bonding force may become insufficient or the fine particles may fall off disadvantageously. When the thickness is too large, blocking may occur or the haze value may become large disadvantageously.

Any known coating technique may be employed. For example, roll coating, gravure coating, roll brush coating, spray coating, air knife coating, immersion and curtain coating may be used alone or in combination. The coating layer may be formed on one side or both sides of the film. When the coating layer is formed on both sides and a hard coat having a flat surface is formed on one side, winding properties remain excellent advantageously.

[Physical Properties]

The laminated polyester film of the present invention has a total haze value of preferably 1.5% or less. The surface haze value of the coating layer is preferably 0.60% or less and the surface friction coefficient ($\mu s$) of the coating layer is preferably 0.4 or less. This laminated polyester film can be obtained by forming a coating layer of the above coating composition on the polyester film.

According to the present invention, a film having excellent scratch resistance, transparency, adhesion and slipperiness and high coating quality can be obtained.

EXAMPLES

The following examples are given to further illustrate the present invention.

Physical properties were evaluated by the following processes.

(1) Scratch Resistance

A pin plated with hard chromium and having a diameter of 6 mm was fixed and a film sample having a length of 20 cm and a width of 15 mm was brought into contact with the pin at 90° and caused to slide over the pin a fixed distance (20 cm) 10 times at a fixed speed (20 mm/s) to evaluate scratches on the surface of the film.

5: no scratch

4: 0%<proportion of total area of scratches to the entire area≦10%

3: 10%<proportion of total area of scratches to the entire area≦25%

2: 25%<proportion of total area of scratches to the entire area≦50%

1: 50%<proportion of total area of scratches to the entire area (2) Haze

Total Haze

The haze value of the film was measured with the haze measuring instrument (NDH-2000) of Nippon Denshoku Co., Ltd. in accordance with JIS K7136.

Surface Haze

This was measured with the haze measuring instrument (NDH-2000) of Nippon Denshoku Co., Ltd. in accordance with JIS K7136. The surface haze was obtained from the following equation by measuring the haze value of a laminate prepared by canceling the hazes of the mating surfaces of two films assembled together by cedar oil.

(surface haze)=(total haze)×2−(haze value of a laminate of two films)

(3) Center Line Average Surface Roughness (Ra)

When a chart was drawn at a needle radius of 2 μm, a magnification of 200, 000× under a load of 30 mg and a cut-off of 0.08 mm by using the SE-3FAT high-precision surface roughness meter of Kosaka Kenkyusho Co., Ltd. in accordance with JIS B0601, the measurement length portion L in the center line direction was extracted from the surface roughness curve, and the center line of this extracted portion was plotted on the X axis and the direction of longitudinal magnification was plotted on the Y axis to represent a roughness curve by Y=f(x), a value given by the following equation was expressed in the unit of nm. This measurement was made 4 times with a standard length of 1.25 mm and the mean value of these measurement data was taken as the center line average surface roughness.

$$Ra=(1/L)\int_{O}^{L}|f(x)|dx$$

(4) Friction Coefficient (μs)

The statical friction coefficients (μs) of the coating film formed surfaces when a coating solution was applied to both sides of the film and the statical friction coefficients of the coating film formed surface and the coating film non-formed surface when the coating solution was applied to one side were measured by the slipperiness measuring instrument of Toyo Tester Co., Ltd. in accordance with ASTM D1894-63. A glass plate was used as a sled plate and the load was 1 kg.

(5) Adhesion

Hard Coat

A hard coat layer having a thickness of 10 μm was formed on the coating film formed surface of an adhesive polyester film and cross cut in a check pattern (100 1-mm squares), and a 24 mm-wide cellophane tape (manufactured by Nichiban Co., Ltd.) was put on the hard coat layer and removed quickly at a peel angle of 180°. The removed surface was observed and evaluated based on the following criteria.

5: removed area is smaller than 10%; extremely high bonding force

4: removed area is 10% or more and smaller than 20%; high bonding force

3: removed area is 20% or more and smaller than 30%; moderate bonding force

2: removed area is 30% or more and smaller than 40%; low bonding force

1: removed area is 40% or more; extremely low bonding force

Pressure Sensitive Adhesive (PSA)

A pressure sensitive adhesive (PSA) layer having a thickness of 20 μm was formed on the coating film formed surface of an adhesive polyester film, put on float glass, left in a 23° C. and 65% RH atmosphere for 1 day and removed at a peel angle of 90° to observe the remaining state of the pressure sensitive adhesive (PSA) on the surface of glass and evaluate it based on the following criteria.

An urethane-containing acrylate copolymer (acrylic components were n-butyl acrylate (86 mol %) and methyl acrylate (14 mol %)) was used as the pressure sensitive adhesive (PSA).

5: area of residual pressure sensitive adhesive (PSA) is smaller than 10%; extremely high bonding force 4: area of residual pressure sensitive adhesive (PSA) is 10% or more and smaller than 20%; high bonding force 3: area of residual pressure sensitive adhesive (PSA) is 20% or more and smaller than 30%; moderate bonding force 2: area of residual pressure sensitive adhesive (PSA) is 30% or more and smaller than 40%; low bonding force 1: area of residual pressure sensitive adhesive (PSA) is larger than 40%; extremely low bonding force (6) Anti-Block Properties Two films were assembled together in such a manner that their coating film formed surfaces came into contact with each other, a pressure of 0.6 kg/cm² was applied to this assembly in a 60° C. and 80% RH atmosphere for 17 hours, and the assembled films were separated from each other to evaluate the anti-block properties by its peel strength based on the following criteria.

⊚: peel strength<98 mN/5 cm; extremely high anti-block properties

○: 98 mN/5 cm≦peel strength<147 mN/5 cm; high anti-block properties

Δ: 147 mN/5 cm≦peel strength<196 mN/5 cm; moderate anti-block properties

X: 196 mN/5 cm≦peel strength; low anti-block properties (7) Glass Transition Temperature About 10 mg of a sample was enclosed in an aluminum pan for measurement which was then set in a differential calorimeter (V4.OB2000 DSC of E.I. DuPont DE Nemous Co.), the temperature was raised from 25° C. to 300° C. at a rate of 20° C./min and maintained at 300° C. for 5 minutes, and the pan was taken out from the calorimeter and placed on ice immediately to be quenched. This pan was set in the differential calorimeter again to be heated from 25° C. at a rate of 20° C./min so as to measure the glass transition temperature (Tg: ° C.).

(8) Intrinsic Viscosity

The intrinsic viscosity ([η] dl/g) was measured in an o-chlorophenol solution at 25° C.

(9) Thickness of Coating Layer

The film was fixed in an embedded resin and cut with a microtome in a cross direction, and the obtained piece was dyed with 2% osmic acid at 60° C. for 2 hours to measure the thickness of the coating layer with a transmission electron microscope (JEM2010 of JEOL Ltd.).

(10) Diameter of Fine Particle

The diameter of each fine particle was measured with a laser diffraction particle size distribution measuring instrument (SALD-7000 of Shimadzu Corporation).

(11) Overall Evaluation

The film was evaluated based on the following criteria.

⊚: scratch resistance is 5, surface haze is 0.60 or less, friction coefficient (μs) is 0.3 or less, adhesion to a hard coat and pressure sensitive adhesive is 5 respectively, surface roughness (Ra) is 10 nm or less and anti-block properties are evaluated as ⊚ (overall evaluation: extremely good)

○: scratch resistance is 4, surface haze is 0.60 or less, friction coefficient (μs) is 0.4 or less, adhesion to a hard coat and pressure sensitive adhesive is 4 or more respectively, surface roughness (Ra) is 10 nm or less and anti-block properties are evaluated as ○ (overall evaluation: good)

Δ: scratch resistance is 3, surface haze is 0.60 or less, friction coefficient (μs) is 0.4 or less, adhesion to a hard coat and pressure sensitive adhesive is 3 or more respectively, surface roughness (Ra) is 10 nm or less and anti-block properties are evaluated as Δ (overall evaluation: moderate)

X: scratch resistance is 2 or less, surface haze is 0.60 or more, friction coefficient (μs) is 0.4 or more, adhesion to a hard coat and pressure sensitive adhesive is 2 or less respectively, surface roughness (Ra) is 10 nm or more and anti-block properties are evaluated as X (overall evaluation: bad)

Examples 1 and 2 and Comparative Examples 1 to 3

Molten polyethylene terephthalate ([η]=0.61 dl/g, Tg=78° C.) was extruded from a die and cooled on a cooling drum by a commonly used method to obtain an unstretched film which was then stretched to 3.4 times in a longitudinal direction, and an aqueous coating solution of a coating composition (solid content of 5%) shown in Table 1 was uniformly applied to both sides of the stretched film with a roll coater. No coating layer was formed in Comparative Example 3.

Thereafter, this coated film was dried at 95° C., stretched to 3.6 times in a transverse direction at 130° C., shrunk by 3% in a cross direction at 230° C. and heat set to obtain a laminated film having a thickness of 100 μm. The thickness of the coating layer was 0.15 μm.

Example 3

Molten polyethylene-2,6-naphthalate ([η]=0.65 dl/g, Tg=121° C.) was extruded from a die and cooled on a cooling drum by a commonly used method to obtain an unstretched film which was then stretched to 3.4 times in a longitudinal direction, and an aqueous coating solution of a coating composition (solid content of 5%) shown in Table 1 was uniformly applied to both sides of the stretched film with a roll coater. Thereafter, this coated film was dried at 105° C., stretched to 3.6 times in a transverse direction at 140° C., shrunk by 3% in a cross direction at 240° C. and heat set to obtain an adhesive film having a thickness of 100 μm. The thickness of the coating layer was 0.15 μm.

Examples 4 to 10 and Comparative Examples 4 to 6

A laminated film was obtained in the same manner as in Example 1 except that an aqueous coating solution of a coating composition shown in Table 2 (solid content of 5%) was used. The thickness of the coating layer was 0.15 μm.

TABLE 1

|  |  |  | Ex. 1 | Ex. 2 | C. Ex. 1 | C. Ex. 2 | Ex. 3 | C. Ex. 3 |
|---|---|---|---|---|---|---|---|---|
| Coating layer composition | Polyester 1 | pbw | 75 | 75 | 75 | 75 | 75 | nil |
|  | Acryl 1 | pbw | 14.9 | 14.9 | 14 | 15 | 14.9 |  |
|  | Fine particles 1 | pbw | 0.1 | 0.5 |  |  | 0.5 |  |
|  | Fine particles 2 | pbw |  |  | 1 |  |  |  |
|  | Aliphatic wax | pbw | 5 | 5 | 5 | 5 | 5 |  |
|  | Wetting agent | pbw | 5 | 5 | 5 | 5 | 5 |  |
| Film evaluation | Scratch resistance |  | 4 | 5 | 2 | 1 | 5 | 1 |
|  | Haze | Total haze % | 0.7 | 0.9 | 0.8 | 0.6 | 0.9 | 0.4 |
|  |  | Haze of double-layer laminate % | 1.1 | 1.3 | 1.2 | 1.0 | 1.3 | 0.7 |
|  |  | Surface Haze % | 0.3 | 0.5 | 0.4 | 0.2 | 0.5 | 0.1 |
|  | Friction coefficient (μs) |  | 0.35 | 0.28 | 0.49 | Not measurable | 0.27 | Not measurable |
|  | Hard coat adhesion |  | 5 | 5 | 5 | 5 | 5 | 1 |
|  | PSA adhesion |  | 5 | 5 | 5 | 5 | 5 | 1 |
|  | Surface roughness (Ra) nm |  | 7 | 8 | 7 | 6 | 8 | 5 |
|  | Anti-block properties |  | ○ | ⊚ | ○ | X | ⊚ | ⊚ |
| Overall evaluation |  |  | ○ | ⊚ | X | X | ⊚ | X |

Ex.: Example
C. Ex.: Comparative Example
Pbw: parts by weight

TABLE 2

|  |  |  | Ex. 4 | Ex. 5 | Ex. 6 | Ex. 7 | Ex. 8 |
|---|---|---|---|---|---|---|---|
| Coating layer composition | Polyester 1 | pbw | 75 | 75 | 75 | 75 |  |
|  | Polyester 2 | pbw |  |  |  |  | 89.5 |
|  | Acryl 1 | pbw | 14.5 | 14.5 | 14.5 | 14.5 |  |
|  | Acryl 2 | pbw |  |  |  |  |  |
|  | Urethane | pbw |  |  |  |  |  |
|  | Fine particles 1 | pbw |  |  |  |  | 0.5 |
|  | Fine particles 3 | pbw | 0.5 |  |  |  |  |
|  | Fine particles 4 | pbw |  | 0.5 |  |  |  |

TABLE 2-continued

|  |  |  |  |  |  |  |  |
|---|---|---|---|---|---|---|---|
| Coating layer composition | Fine particles 5 | pbw |  |  | 0.5 |  |  |
|  | Fine particles 6 | pbw |  |  |  | 0.5 |  |
|  | Fine particles 7 | pbw |  |  |  |  |  |
|  | Fine particles 8 | pbw |  |  |  |  |  |
|  | Aliphatic wax | pbw | 5 | 5 | 5 | 5 | 5 |
|  | Wetting agent | pbw | 5 | 5 | 5 | 5 | 5 |
| Film evaluation | Scratch resistance |  | 4 | 4 | 4 | 4 | 4 |
|  | Haze | Total Haze % | 0.9 | 1.0 | 0.7 | 0.9 | 0.6 |
|  |  | Haze of double-layer laminate % | 1.3 | 1.4 | 1.1 | 1.3 | 0.9 |
|  |  | Surface Haze % | 0.5 | 0.6 | 0.3 | 0.5 | 0.3 |
|  | Friction coefficient (μs) |  | 0.38 | 0.39 | 0.35 | 0.32 | 0.30 |
|  | Hard coat adhesion |  | 5 | 5 | 5 | 5 | 5 |
|  | PSA adhesion |  | 5 | 5 | 5 | 5 | 3 |
|  | Surface roughness (Ra) nm |  | 8 | 8 | 8 | 8 | 8 |
|  | Anti-block properties |  | ◎ | ◎ | ◎ | ◎ | ○ |
| Overall evaluation |  |  | ○ | ○ | ○ | ○ | Δ |

|  |  |  | Ex. 9 | Ex. 10 | C. Ex. 4 | C. Ex. 5 | C. Ex. 6 |
|---|---|---|---|---|---|---|---|
| Coating layer composition | Polyester 1 | pbw |  |  | 75 | 75 | 75 |
|  | Polyester 2 | pbw |  |  |  |  |  |
|  | Acryl 1 | pbw |  |  | 14.5 | 14.5 | 14.5 |
|  | Acryl 2 | pbw | 89.5 |  |  |  |  |
|  | Urethane | pbw |  | 89.5 |  |  |  |
|  | Fine particles 1 | pbw | 0.5 | 0.5 |  |  |  |
|  | Fine particles 3 | pbw |  |  |  |  |  |
|  | Fine particles 4 | pbw |  |  |  |  |  |
|  | Fine particles 5 | pbw |  |  |  |  |  |
|  | Fine particles 6 | pbw |  |  |  |  |  |
|  | Fine particles 7 | pbw |  |  | 0.5 |  | 0.25 |
|  | Fine particles 8 | pbw |  |  |  | 0.5 | 0.25 |
|  | Aliphatic wax | pbw | 5 | 5 | 5 | 5 | 5 |
|  | Wetting agent | pbw | 5 | 5 | 5 | 5 | 5 |
| Film evaluation | Scratch resistance |  | 5 | 4 | 2 | 2 | 2 |
|  | Haze | Total Haze % | 1.0 | 0.7 | 0.9 | 0.9 | 0.9 |
|  |  | Haze of double-layer laminate % | 1.4 | 0.9 | 1.2 | 1.3 | 1.3 |
|  |  | Surface Haze % | 0.6 | 0.5 | 0.6 | 0.5 | 0.5 |
|  | Friction coefficient (μs) |  | 0.29 | 0.31 | 0.45 | 0.39 | 0.42 |
|  | Hard coat adhesion |  | 3 | 4 | 5 | 5 | 5 |
|  | PSA adhesion |  | 5 | 4 | 5 | 5 | 5 |
|  | Surface roughness (Ra) nm |  |  |  | 9 | 8 | 9 |
|  | Anti-block properties |  | ◎ | ○ | ○ | ○ | ○ |
| Overall evaluation |  |  | Δ | ○ | X | X | X |

Ex. Example
C. Ex. Comparative Example
pbw: parts by weieght

A detailed description of each component used in Table 1 and Table 2 is given below.

Polyester 1:

This polyester 1 comprised 90 mol % of terephthalic acid, 5 mol % of isophthalic acid and 5 mol % of 5-sodium sulfoisophthalic acid as acid components and 90 mol % of ethylene glycol and 10 mol % of diethylene glycol as glycol components (Tg=70° C., average molecular weight of 15,000). The polyester was manufactured in accordance with the method described in Example 1 of JP-A 06-116487 as follows. That is, 53 parts of dimethyl terephthalate, 3 parts of dimethyl isophthalate, 5 parts of dimethyl 5-sodium sulfoisophthalate, 36 parts of ethylene glycol and 3 parts of diethylene glycol were fed to a reactor, 0.05 part of tetrabutoxy titanium was added to the reactor and heated in a nitrogen atmosphere by controlling the temperature to 230° C., and the formed methanol was distilled off to carry out an ester exchange reaction. Thereafter, the temperature of the reaction system was raised to 255° C. gradually and the inside pressure of the system was reduced to 1 mmmHg to carry out a polycondensation reaction so as to obtain a polyester.

Polyester 2:

This polyester 2 comprised 65 mol % of 2,6-naphthalenedicarboxylic acid, 30 mol % of isophthalic acid and 5 mol % of 5-sodium sulfoisophthalic acid as acid components and 90 mol % of ethylene glycol and 10 mol % of diethylene glycol as glycol components (Tg=70° C., average molecular weight of 15,000). The polyester was manufactured as follows. That is, 44 parts of dimethyl 2,6-naphthalenedicarboxylate, 16 parts of dimethyl isophthalate, 4 parts of dimethyl 5-sodium sulfoisophthalate, 33 parts of ethylene glycol and 2 parts of diethylene glycol were fed to a reactor, 0.05 part of tetrabutoxy titanium was added to the reactor and heated in a nitrogen atmosphere by controlling the temperature to 230° C., and the formed methanol was distilled off to carry out an ester exchange reaction. Thereafter, the temperature of the reaction system was raised to 255° C. gradually in a polymerizer having a stirrer with large motor torque and the inside pressure of the system was reduced to 1 mmHg to carry out a polycondensation reaction so as to obtain a polyester having an intrinsic viscosity of 0.53. 25 parts of this polyester was dissolved in 75 parts of tetrahydrofuran, and 75 parts of water was added dropwise to the obtained solution under high-speed agitation at 10,000 rpm to obtain a milky-white dispersion which was then distilled at a reduced pressure of 20 mmHg to distill off tetrahydrofuran. A water dispersion of the polyester 2 was obtained.

Acrylic 1:

This acrylic 1 comprised 30 mol % of methyl methacrylate, 30 mol % of 2-isopropenyl-2-oxazoline, 10 mol % of polyethylene oxide (n=10) methacrylate and 30 mol % of acrylamide (Tg=50° C., molecular weight of 370,000). The acrylic was manufactured in accordance with the method described in Production Examples 1 to 3 of JP-A 63-37167 as follows. That is, 302 parts of ion exchange water was fed to a four-necked flask and heated up to 60° C. in a nitrogen stream, 0.5 part of ammonium persulfate and 0.2 part of sodium hydrogen nitrite were added as polymerization initiators, and further a mixture of 23.3 parts of methyl methacrylate, 22.6 parts of 2-isopropenyl-2-oxazoline, 40.7 parts of polyethylene oxide (n=10) methacrylic acid and 13.3 parts of acrylamide as monomers was added dropwise to the obtained solution over 3 hours by controlling the temperature of the liquid to 60 to 70° C. After the end of addition, the reaction was continued under agitation by maintaining the above temperature for 2 hours, and then the reaction product was cooled to obtain a water dispersion of acrylic having a solid content of 25%.

Acrylic 2:

This acrylic 2 comprised 65 mol % of methyl methacrylate, 25 mol % of butyl acrylate, 5 mol % of 2-hydroxyethyl acrylate and 5 mol % of N-methylolacrylamide (Tg=45° C.). The acrylic was manufactured in accordance with the method described in Production Examples 1 to 3 of JP-A 63-37167 as follows. That is, 302 parts of ion exchange water was fed to a four-necked flask and heated up to 60° C. in a nitrogen stream, 0.5 part of ammonium persulfate and 0.2 part of sodium hydrogen sulfite were added as polymerization initiators, and further a mixture of 50.5 parts of methyl methacrylate, 24.9 parts of butyl acrylate, 4.5 parts of 2-hydroxyethyl acrylate and 3.4 parts of N-methylolacrylamide as monomers was added dropwise to the obtained solution over 3 hours by controlling the temperature of the liquid to 60 to 70° C. After the end of addition, the reaction was continued under agitation by maintaining the above temperature for 2 hours, and then the reaction product was cooled to obtain a water dispersion of acrylic 2 having a solid content of 25%.

Urethane:

This urethane comprised 70 wt % of neopentyl glycol and 30 wt % of polyethylene glycol as polyol components, 20 wt % of hexamethylene diisocyanate as a polyisocyanate component, 5 wt % of butanone oxime as a blocking agent, 3 wt % of dimethylolpropionic acid as a hydrophilic nature providing component and 3 wt % of triethylamine as a neutralizing component. After dispersion in water, 30wt % of 2-ethylhexyl methacrylate base on the above components was used to carry out emulsion polymerization so as to obtain an urethane resin. The water dispersion comprised 90 wt % in terms of solid weight of this urethane resin and 10 wt % in terms of solid weight of polyoxyethylene lauryl ether as a wetting agent.

Fine Particles 1:

Silica.acrylic composite fine particles (average particle diameter: 1,200 nm) (manufactured by Nippon Shokubai Co., Ltd., trade name of Soliostar 12)

Fine Particles 2:

Acrylic filler (average particle diameter: 140 nm) (manufactured by Nippon Paint Co., Ltd., trade name of Nippei Microgel E-6000)

Fine Particles 3:

Arbitrary inorganic-organic composite particles were manufactured in accordance with Production Examples A1 to A6 of JP-A 10-237348. They were inorganic-organic composite particles comprising silicon oxide core particles coated with an acrylic resin essentially composed of methacrylate (average particle diameter: 400 nm, core particle diameter: 200 nm)

Fine Particles 4:

Arbitrary inorganic-organic composite particles were manufactured in accordance with Production Examples A1 to A6 of JP-A 10-237348. They were inorganic-organic composite particles comprising core particles essentially composed of methacrylate and divinyl benzene coated with silicon oxide (average particle diameter: 300 nm, core particle diameter: 150 nm)

Fine Particles 5:

Arbitrary inorganic-organic composite particles were manufactured by using particles essentially composed of zirconium oxide having a porous structure as core particles in accordance with Production Examples A1 to A6 of JP-A 10-237348. They were inorganic-organic composite particles comprising particles essentially composed of zirconium oxide having a porous structure into which an acrylic resin essentially composed of methacrylate penetrated to be chemically fixed (average particle diameter: 350 nm)

Fine Particles 6:

Arbitrary inorganic-organic composite particles were manufactured by using particles essentially composed of titanium oxide having a porous structure as core particles in accordance with Production Examples A1 to A6 of JP-A 10-237348. They were inorganic-organic composite particles comprising particles essentially composed of titanium oxide having a porous structure into which an acrylic resin essentially composed of methacrylate penetrated to be chemically fixed (average particle diameter: 350 nm)

Fine Particles 7:

MX-200W organic particles essentially composed of methacrylate (average particle diameter: 200 nm) of Nippon Shokubai Co., Ltd.

Fine Particles 8:

MP-4540M inorganic particles essentially composed of silicon oxide (average particle diameter: 450 nm) of Nissan Chemical Industries, Ltd.

Aliphatic wax: polyethylene wax (manufactured by Chukyo Yushi Co., Ltd., trade name of Polorin H-481)

Wetting agent: polyoxyethylene (n=7) lauryl ether (manufactured by Sanyo Chemical Industries, Ltd., trade name of Naroacty N-70)

INDUSTRIAL FEASIBILITY

The film of the present invention is useful for optical applications, particularly as a base film for prism lens sheets, touch panels, back lights, plasma displays and organic EL displays, as a base film for anti-reflection films and a base film for preventing the explosion of a display.

The invention claimed is:

1. A laminated polyester film comprising:
   (A) a polyester film; and
   (B) a 0.04 to 0.5 microns thick coating layer formed on at least one side of the polyester film (A) and made of a coating composition comprising 5 to 95 wt % polyester resin having a glass transition point of 60 to 80° C., 5 to 95 wt % of an acrylic resin having an oxazoline group and a polyalkylene oxide chain and inorganic-organic composite particles having an average particle diameter of 300 to 1500 nm and containing 10 to 40 wt % of elemental silicon and wherein the composite particles are present in an amount of 0.01 to 5 parts by weight based on 100 parts by weight of the coating composition of the coating layer.

2. The laminated polyester film according to claim 1, wherein the inorganic-organic composite particles comprise silicon.

3. A process of manufacturing a laminated polyester film, comprising the steps of:
   applying an aqueous coating solution to at least one side of a polyester film before the completion of crystal orientation of the polyester film; and
   stretching the coated film in at least one direction and heat setting it to form a coating layer on at least one side of the stretched polyester film,
   wherein the aqueous coating solution yields the coating layer which is 0.04 to 0.5 microns thick and is made of a coating composition comprising 5 to 95 wt % polyester resin having a glass transition point of 60 to 80° C., 5 to 95 wt % of an acrylic resin having an oxazoline group and a polyalkylene oxide chain and inorganic-organic composite particles having an average particle diameter of 300 to 1500 nm and containing 10 to 40 wt % of elemental silicon and wherein the composite particles are present in an amount of 0.01 to 5 parts by weight based on 100 parts by weight of the coating composition of the coating layer.

* * * * *